United States Patent [19]

Biancardi

[11] 4,315,599

[45] Feb. 16, 1982

[54] APPARATUS AND METHOD FOR AUTOMATICALLY WATERING VEGETATION

[76] Inventor: Robert P. Biancardi, 6929 Northcote, Hammond, Ind. 46324

[21] Appl. No.: 126,408

[22] Filed: Mar. 3, 1980

[51] Int. Cl.³ ............................................. A01G 25/02
[52] U.S. Cl. ...................................... 239/10; 47/48.5; 55/80; 55/267; 62/3; 239/37; 239/43; 239/63; 239/128; 239/315; 239/565
[58] Field of Search ................. 62/3, 283, 288; 55/80, 55/267; 47/1.7, 48.5; 137/78.3; 239/1, 10, 13, 37–43, 63, 128, 132, 132.3, 289, 315, 450, 556, 565, 542

[56] References Cited

U.S. PATENT DOCUMENTS

| | | | |
|---|---|---|---|
| 1,814,573 | 7/1931 | Shaffer | 239/315 X |
| 2,779,172 | 1/1957 | Lindenblad | 62/3 |
| 3,195,816 | 7/1965 | Mercer | 239/63 |
| 4,146,372 | 3/1979 | Groth et al. | 55/80 X |

FOREIGN PATENT DOCUMENTS 2640106  3/1978  Fed. Rep. of Germany ........ 239/63

Primary Examiner—Andres Kashnikow
Attorney, Agent, or Firm—Hill, Van Santen, Steadman, Chiara & Simpson

[57] ABSTRACT

A method and apparatus for automatically watering vegetation whereby the water requirement of vegetation is constantly monitored and selectively condensing water vapor out of the atmosphere onto cooled condensation member and collecting the condensed moisture for application onto soil containing vegetation. Various accessories are provided to automatically feed the vegetation and distribute water to the soil containing the vegetation.

16 Claims, 9 Drawing Figures

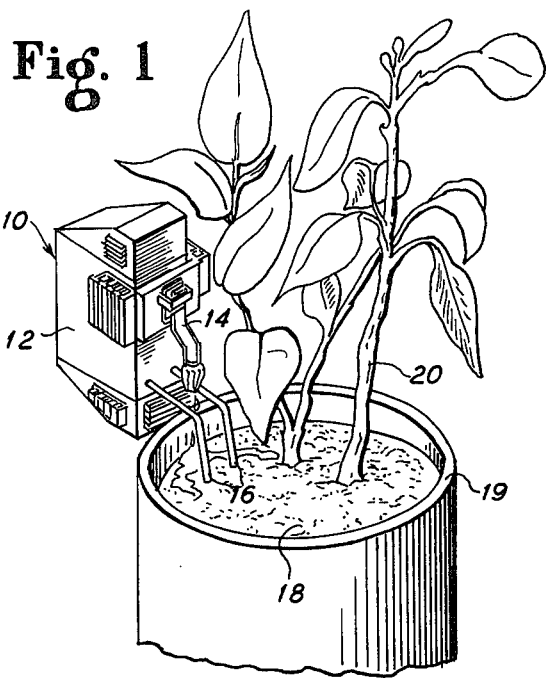
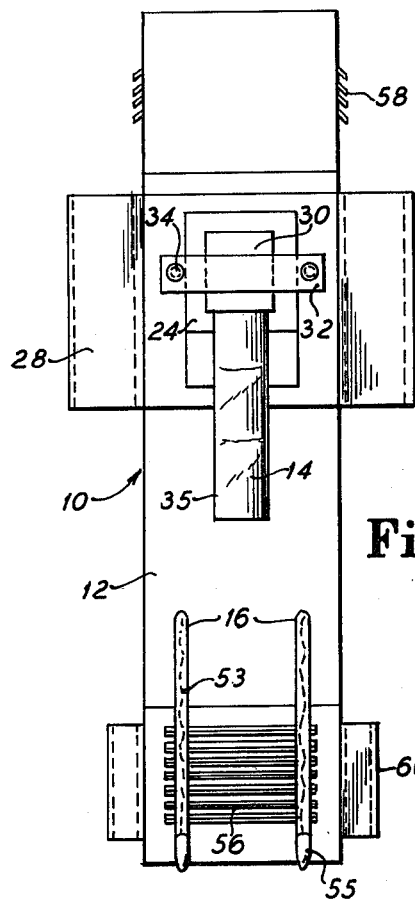
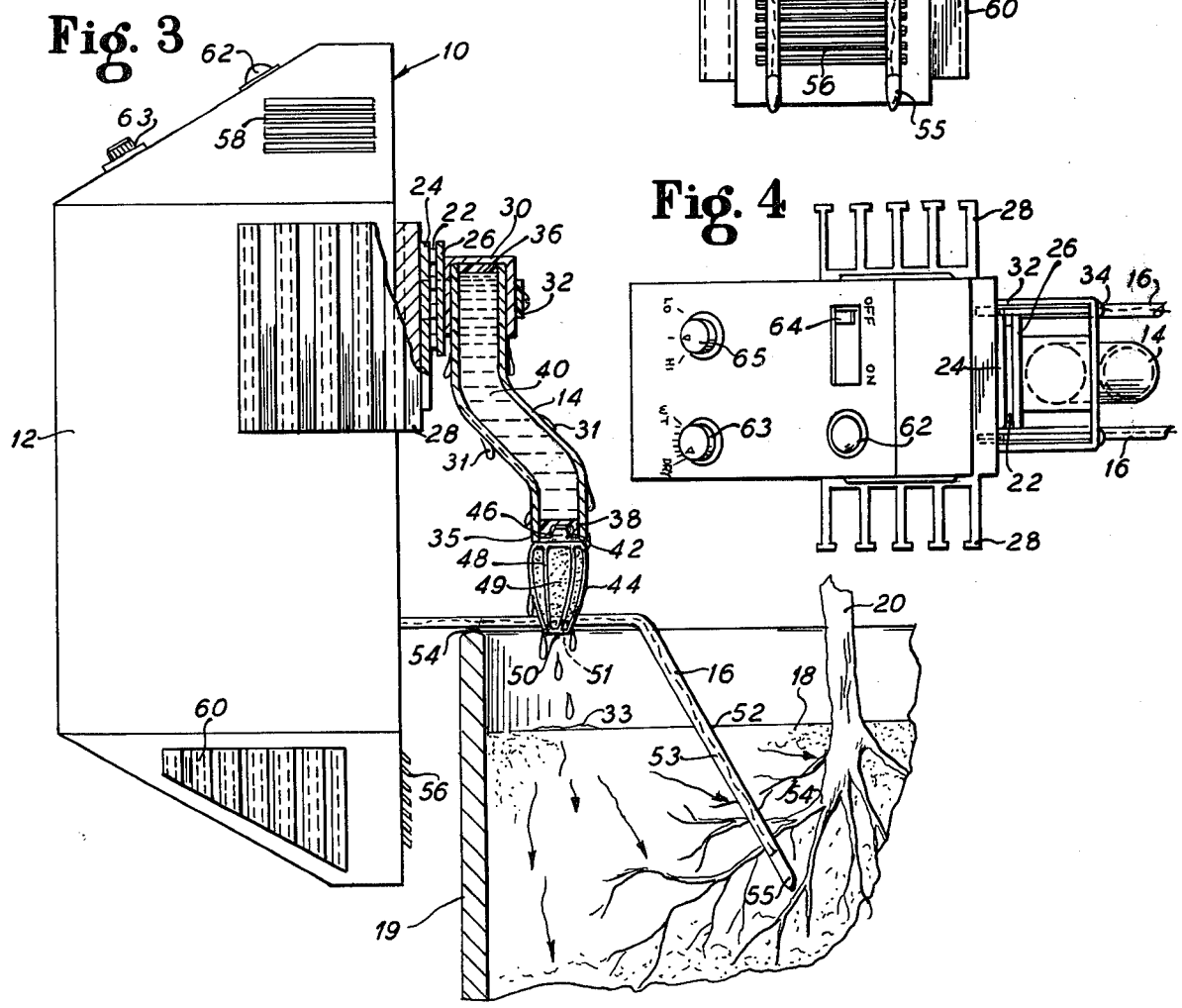

Fig. 8
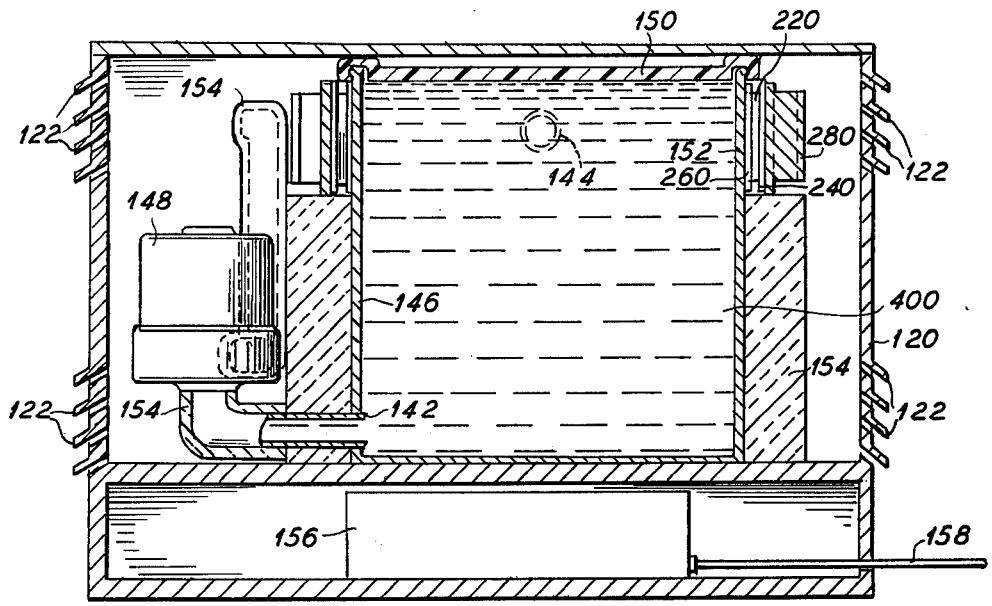
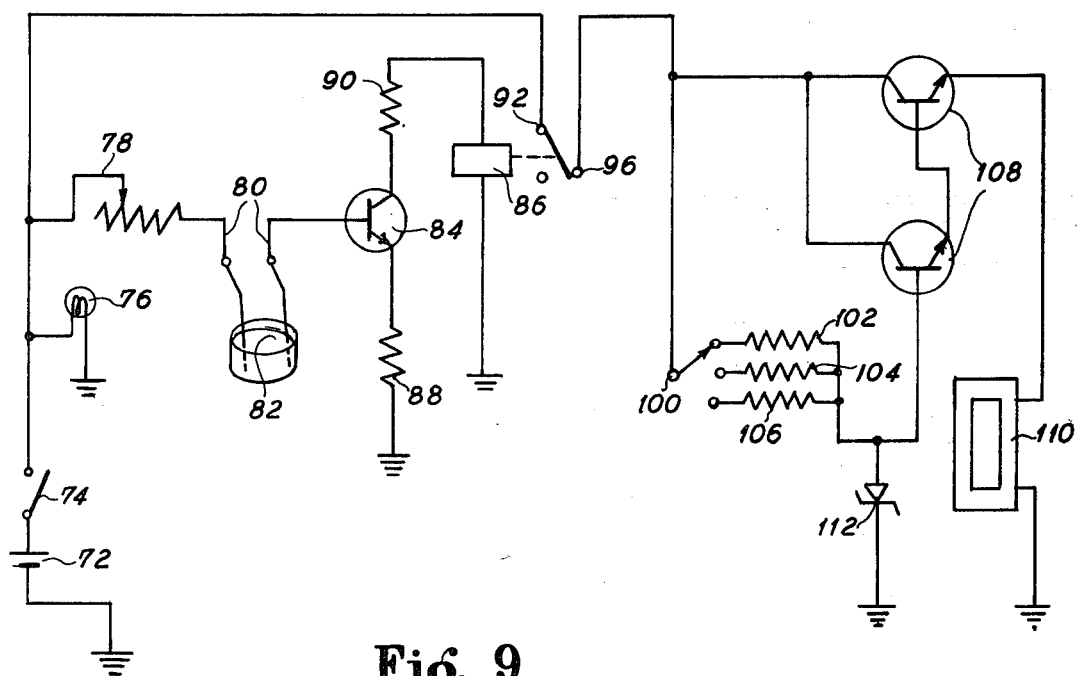
Fig. 9

APPARATUS AND METHOD FOR AUTOMATICALLY WATERING VEGETATION

BACKGROUND OF THE INVENTION

1. Field of the Invention

This invention relates to an apparatus and method for automatically watering vegetation by condensing water humidity out of the atmosphere.

2. Description of the Prior Art

Methods of watering vegetation in common usage are quite varied, however all require one common element, a supply of liquid water. The actual means used to transport the liquid water from its source to the location of the vegetation ranges from manually carried buckets or watering cans to elaborate automated piped sprinkling systems.

The present invention does not require a source of liquid water, but rather relies on water vapor contained in the atmosphere. This water vapor is condensed at a location proximate to the vegetation being watered and as the water vapor condenses and collects, it drips directly onto the soil surrounding the vegetation thereby obviating the need for elaborate water transporting devices.

SUMMARY OF THE INVENTION

The present invention provides for an improvement over the existing art in that it provides for an automatic vegetation watering method and apparatus which does not require a source of liquid water and which does not require elaborate liquid water transporting apparatus. Further, the device is small, portable low cost and requires only a small amount of energy to operate.

In accordance with the principles of the invention, one embodiment of the invention comprises a method whereby the water requirement of the vegetation is continuously monitored. If the vegetation requires watering, the temperature of a condensation member is lowered to below ambient dew point temperature causing water vapor in the atmosphere to condense on the condensation member. This water then collects and drips onto the soil surrounding the vegetation. This dripping will continue until the vegetation no longer requires additional watering. The temperature of the condensation member will then be allowed to rise above the ambient dew point halting further condensation.

Another embodiment of the invention comprises an apparatus or device comprised of a power supply source connected via electrical circuitry to a thermocouple which has the capacity to produce a thermally hot side and a thermally cold side when supplied with electrical current. A condensation member is connected to the cold side of the thermocouple via a heat transfer member so as to permit the condensation member to achieve a temperature below that of the ambient dew point temperature. Water condensation forms on the condensation member, collecting thereon and dripping therefrom onto the soil surrounding the vegetation. Further, means for detecting vegetation moisture requirements such as electrical probes placed in the soil surroundng the vegetation and connected by electrical circuitry to the circuit containing the power supply source and thermocouple may be used. The probe and accompanying circuitry may act as a switch whereby when the soil is dry, current is allowed to flow from the power supply source to the thermocouple, thus causing water vapor to condense on the condensation member and drip onto the soil. When the soil is sufficiently moist, the current from the power supply source is prevented from flowing to the thermocouple, thus stopping the condensation.

Another embodiment of the invention comprises a device similar to that described above, wherein the condensation member is comprised of a tubular member forming a circuit. A fluid is forced through the interior of the tubular condensation member by means of a pump integral with the tubular circuit and is caused to flow past the cold side of the thermocouple, thus creating a large condensation member which may provide water to vegetation spread over large areas.

Various attachments are provided to be placed gravitationally below the dripping point of the condensation member, such attachments to be used for distributing the drops condensed and holding fertilizer to be carried by the drops into the soil surrounding the vegetation.

DESCRIPTION OF THE DRAWINGS

FIG. 1 is a perspective view of the apparatus for automatically watering vegetation in an operating position.

FIG. 2 is a front view of the device shown in FIG. 1.

FIG. 3 is a side view of the device shown in FIG. 1.

FIG. 4 is a top view of the device shown in FIG. 1.

FIG. 8 is a sectional view along lines XIII—XIII of FIG. 7.

FIG. 9 is a schematic drawing of the electrical circuitry used in the device.

DESCRIPTION OF THE PREFERRED EMBODIMENTS

Figure 5:
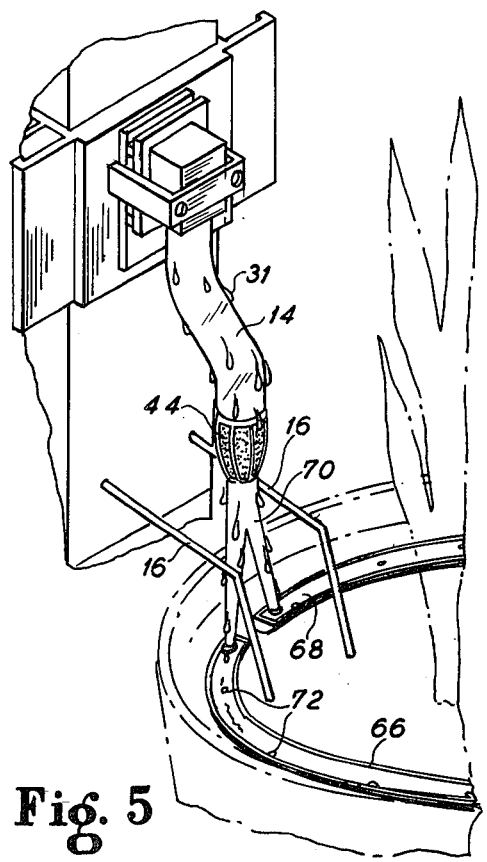
FIG. 5 is a perspective view of an alternative embodiment of the device incorporating a water distribution attachment.

In FIG. 1 an apparatus for automatically watering vegetation is shown generally at 10 in its operating position. The apparatus 10 is comprised of a housing 12, a condensation member 14 and a pair of electrical probes 16. The probes 16 are inserted into soil 18 containing vegetation 20 such that the condensation member 14 is positioned gravitationally above the soil 18. The soil 18 and vegetation 20 may be contained in a pot 19 or other suitable container.

FIGS. 2 and 3 show the apparatus 10 in more detail. In these views it is seen that the housing 12 has attached thereto a thermocouple 22 such as a Peltier crystal, which is capable of producing a hot side 24 and a cold side 26 when supplied with electrical current. Connected to the hot side 24 of the thermocouple 22 is a heat sink 28 which dissipates the heat produced by the hot side 24. The heat sink 28 is illustrated in this embodiment as the fin-type radiant heat sink particularly suited for use in association with electrical circuits.

Attached to the cold side 26 of the thermocouple 22 is a conduction member 30 which may be made of thermally conductive material such as aluminum or other highly conductive material. The conduction member 30 is shown as a solid block with an orifice therein formed to receive the top end of the condensation member 14 and thus, completely encapsulates that end. The conduction member 30 has the effect of drawing heat from the condensation member 14 which is thermally connected thereto. The condensation member 14 has a condensation surface exposed to the environmental ambient and can thus be cooled to a temperature lower than the ambient dew point temperature. This causes water vapor from the atmosphere to condense on the condensation surface of the condensation member 14. Condensed water vapor collects on the surface and forms water droplets 31 which gravitationally run down the condensation member 14 toward a collector 35 which may comprise a tapered point which has the effect of collecting and aggregating the condensed moisture into droplets suitable for application to the soil. The tapered point directs the droplets onto the soil 18 at 33. A retaining strap 32 made of a thermally nonconductive material such as a plastic, is provided to retain the condensation member 14, the conduction member 30 and the cold side 26 of the thermocouple 22 in close contact and is attached to the housing 12 by appropriate fastening means 34 such as screws.

The condensation member 14 is preferably made of a material which will not corrode due to water forming thereon, such as glass, plastic or a noncorrodible metal and it may be in the form of a hollow tube as shown in FIG. 3 so that the condensation surface formed thereby is of a cylindrical configuration. The condensation member 14 can be made in a variety of shapes and does not have to be tube like. It can be shaped and disposed such that all of the condensed water droplets forming on its surface will collect and drip from a collector 35, or it may be shaped such that condensed water forming thereon will collect and drip from a plurality of collector areas.

In the embodiment of FIG. 3, the condensation member 14 is a hollow tube, capped on the top end with a plug 36 and on the bottom end near the collector with another plug 38. Carried within the hollow condensation member is a thermally conductive liquid 40 which is capable of retaining a liquid phase in the range of temperatures from 0° centigrade or below to 70° centigrade or above. The hollow tube condensation member 14 may be made of a transparent or translucent material and the fluid 40 is selectively colored to create a pleasing esthetic appearance while displaying the level of fluid 40 in a member 14. The plugs 36 and 38 may be permanently sealed in the condensation member 14 to permanently retain the fluid 40 therein. The plug 38 should produce a liquid impermeable seal with the condensation member walls to prevent the fluid 40 from leaking out.

It is contemplated by the present invention that the plug 38 be provided with a receptacle 42 for receiving various attachments thereto constituting collectors and directors for the condensation surface. One such attachment is a cartridge 44 shown in FIG. 3, which may be removably attached to the plug 38 by means of a knob 46 which is inserted into the receptacle 42 and frictionally retained therein.

The cartridge 44 is comprised of a plurality of ribs 48 connecting the knob 46 with a lower end portion 50 thereby comprising an enclosure 49 and is shown as having a tapered configuration so that the lower end is somewhat smaller or pointed. The lower end portion 50 may also contain a recessed receptacle 51 for retaining additional attachments in a like manner as described above.

If desired, the enclosure 49 may be charged with a supply of plant feeding material, for example, a pellet which is slowly eroded by the water droplets 31 and carried onto the soil 18 admixed with the droplets. The cartridge 44 may be removed from the plug 38 and replaced by other cartridges or other attachments or may be discarded if empty or it may be designed to be refilled. Various colors of the cartridge may be used to denote different types of plant food suitable for different types of vegetation. The apparatus 10 may also be operated without any attachments.

Probes 16 are shown in FIG. 3 as entering the soil at 52 and extending into the soil 18 and being proximate to roots 54 of the vegetation 20. The probes 16 may be made of an electrical conducting material with an insulating material 53 covering most of the length of the probes except for the ends 55 farthest away from the housing 12. The probes 16 may also be made of a nonconductive material with electrical wires carried therein and exposed at an end away from the housing. The exposed ends 55 are used to test the moistness of the soil by measuring the electrical conductivity of the soil 18 adjacent the probe ends 55. Insertion of the probes 16 into the soil 18 also allows for proper placement of the apparatus 10 and assures a stable position for the apparatus 10. Further, the probes 16 may rest on the pot 19 at the point shown at 54 for additional support and stability.

As seen in FIGS. 2 and 3, the housing 12 also contains air vents 56 and 58 and heat sinks 60 to provide cooling for electrical circuitry and components contained within the housing. A power indicator light 62 is shown in FIG. 3 and is better shown in FIG. 4. A control knob 63 used in setting the moistness of the soil is shown in FIGS. 3 and 4. Also shown in FIG. 4 is an on-off switch 64 for use in manually controlling the apparatus 10 and a control knob 65 for adjusting the temperature of the condensation member 14.

FIG. 5 shows an alternative embodiment of the invention wherein a water distributing member 66 is removably attached to the cartridge 44 in a manner like that described above for the attachment of the cartridge 44 to the plug 38. The water distributing member 66 may also be attached directly to the plug 38 when the cartridge 44 is not in use. The water distributing member 66 is comprised of a trough portion 68 and a connecting portion 70. The connecting portion 70 removably attaches to the cartridge 44 or the plug 38 and attaches on the opposite end to the trough portion 68. Contained in the bottom of the trough are a plurality of small holes 72. Water droplets 31 run down the connecting portion 70 and collect in the trough portion 68. As the water level of the collected droplets rises in the trough, the water pressure causes drops to be forced out of the small holes 72 in various locations around the vegetation. The condensation member 14 may be shaped such that condensed water droplets 31 forming thereon will collect and drip from a plurality of points as described above, whereby the water distributing member 66 would not be required.

Figure 7:
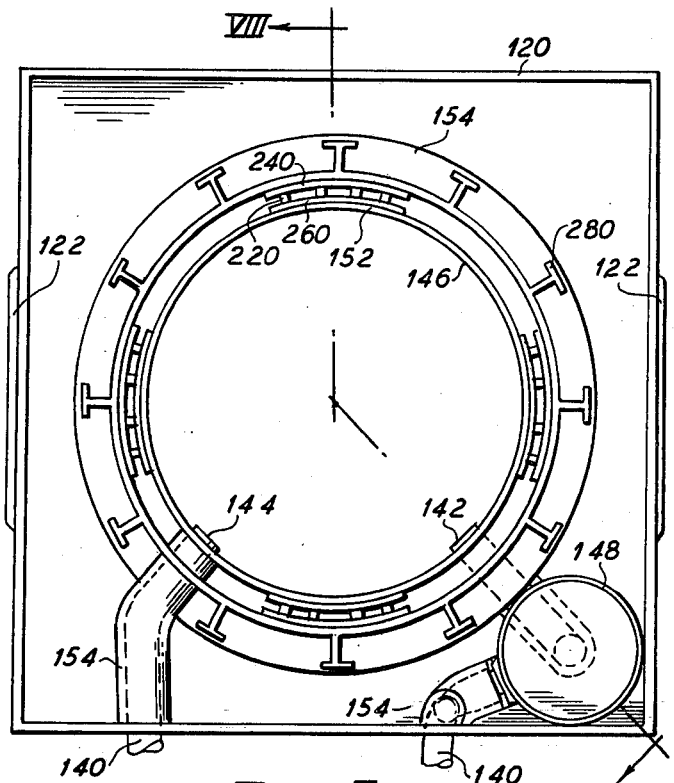
FIG. 7 is a top sectional view of the contents of the device shown in FIG. 6.
Figure 6:
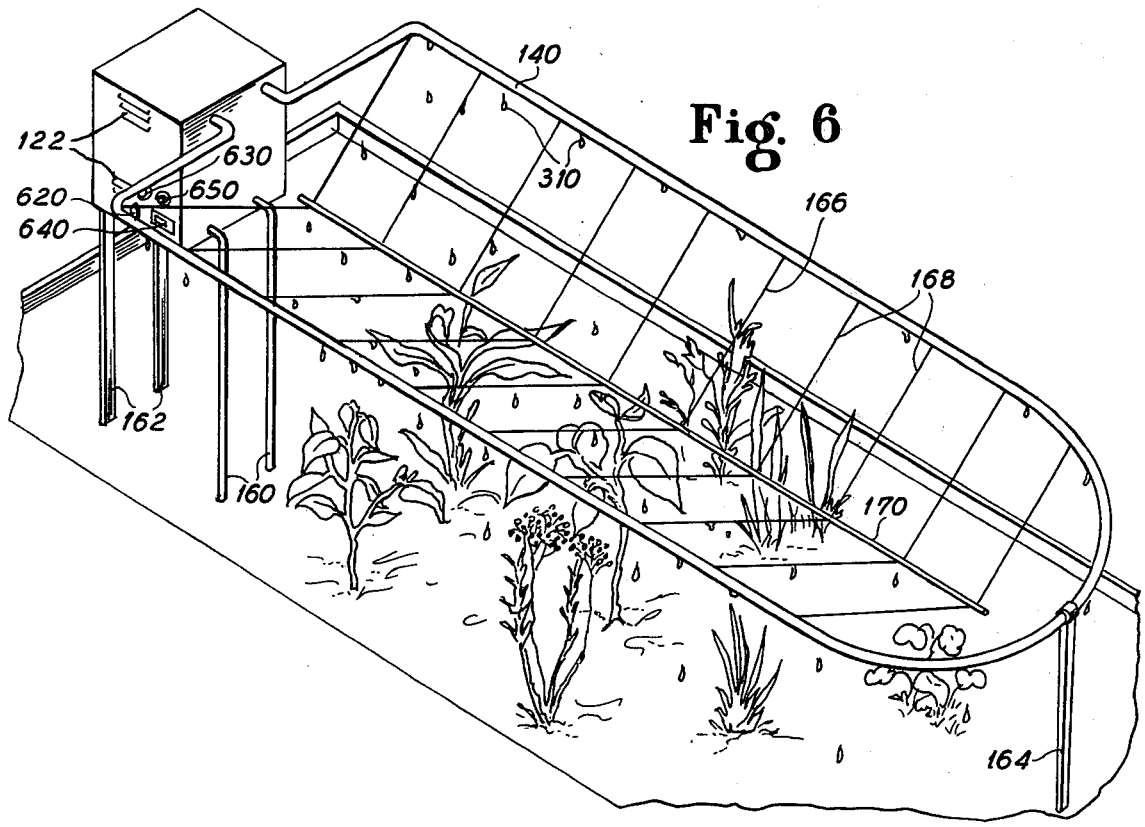
FIG. 6 is an alternative embodiment of the device for automatically watering vegetation over a large area.

A further embodiment of the invention is shown in FIGS. 6, 7 and 8 wherein the condensation member 140 is comprised of a hollow tube or pipe forming a complete circuit and having an inlet 142 and an outlet 144 integral with the interior of a collection and cooling reservoir 146. A pump 148 is provided in the circuit to circulate a fluid 400 similar to the fluid 40 described above through the circuit. The fluid 400 enters the condensation member 140 through inlet 142 and into the pump 148. Upon completing the circuit through the condensation member 140, the fluid 400 returns to the collection and cooling reservoir 146 through outlet 144. A cover 150 is provided for the reservoir 146 to prevent evaporation of the fluid 400. One or more thermocouples 220 similar to the thermocouple 22 described above are retained against side walls 152 of the reservoir 146 such that the cold side 260 is adjacent the wall 152. Heat sinks 280, similar to those heat sinks 28 described above, are provided and retained adjacent the hot side 240 of the thermocouples 220. The side walls 152 of the reservoir 146 should be made of a thermally conductive material. Thermally nonconductive insulating material 154 is provided around the outside of the side walls 152 and piping 140 proximate to the reservoir 146 to prevent undesired heat transfer. Electrical circuitry is contained within a water-tight box 156 and is supplied with power through electrical cord 158. A housing 120 is provided to encompass all of the above described parts except for the condensation member piping 140 as shown in FIG. 6. Air vents 122 are provided in the housing 120 to prevent heat build up therein. Provided on the exterior of the housing 120 is a power indicator light 620, an on-off switch 640 and control knobs 630 and 650. Also extending beyond the exterior of the housing 120 are a pair of probes 160 which are similar to probes 16 described above. The condensation member 140 forms a circuit which is positioned above the soil containing vegetation as shown in FIG. 6. Supports 162 are provided for the housing 120 and support 164 is provided for the condensation member 140 at an end opposite the housing 120. A condensation distributing means 166 is attached to the condensation member 140 and is comprised of strings 168 attached to either end to the condensation member 140 and retained in place by a connecting member 170.

As electrical current is supplied to the thermocouples 220, the cold side draws heat from the fluid 400 in the collection and cooling reservoir 146. The inlet 142 is positioned near the bottom of the reservoir 146 to draw off the coldest fluid and circulate it through the condensation member 140 cooling it to a temperature below that of the ambient dew point. As this temperature is achieved, water vapor in the atmosphere condenses and forms water droplets 310 on the condensation member 140. The water droplets 310 are distributed over the vegetation by the distributing means 166 by providing additional dripping points for the drops 310.

The electrical circuitry used in operating the apparatus is shown in FIG. 9. As seen in the Figure, a power source 72 is shown as a battery. However, this power supply may also be a rectified alternating current source or it may be a direct current power source supplied by solar cells or any other type of available electrical current such as an available domestic supply which may be transformed into a direct current power supply. A switch is provided at 74 for activating the device. This switch is seen in FIG. 4 at 64 and FIG. 6 and 640. An indicator light 76 is provided to show when a sufficient power supply is available and switch 74 is in the closed position. This indicator light 76 corresponds to indicator light 62 as shown in FIGS. 3 and 4 and indicator light 620 as shown in FIG. 6. A variable resistor is shown at 78 for controlling the amount of current supplied to the rest of the circuit. This resistor 78 corresponds to control knobs 63 and 630 described above. Shown pictorially at 80 are electrical probes which correspond to probes 16 and 160 above. Placement of these probes 80 into soil shown here at 82, creates a resistor whose value is dependent upon the moisture of the soil. A switching transistor 84 is provided as a means of supplying current to a relay 86 if the soil is moist or to ground if the soil is dry. Resistors 88 and 90 are provided in order to set a value at which the switching transistor 84 is turned on or off. If current is supplied to relay 86, contact is disconnected between points 92 and 96, disrupting current flow through the circuit. If no current is supplied through relay 86, then contact is made between points 92 and 96 allowing current to continue through the circuit.

A selector switch 100 is provided to allow for manual selection of current value flowing through the circuit. This switch 100 corresponds to control knobs 65 and 650 described above. Three resistors are shown at 102, 104 and 106, each having different values. Current flows through a selected resistor to a Darlington amplifier arrangement 108 for amplification of the current which then flows through thermocouple 110. This thermocouple corresponds to the thermocouples 22 and 220 described above. A zener diode 112 is provided to protect the circuit from current overload.

The circuitry shown in representative of the type of circuitry which can be used to operate the apparatus in accordance with the principles of the invention. It should be understood that operational amplifier circuitry or micro processors may be used instead of the specific components named herein in a manner consistent with the principles of the invention to produce the advantageous function and result of the circuit shown to illustrate the invention.

The circuitry is basically comprised of two circuits, the first being a testing circuit operating a switch to turn the second circuit on or off. The first circuit tests the resistance of the soil as a means of determining the water needs of the plant of vegetation. Other methods of determining plant moisture requirements are also contemplated in this disclosure. Such means include measuring the electro magnetic waves propagated by a plant and using such measurement to switch the circuit to the on position when such measurement indicates that because of the frequency and amplitude of the waves being propagated, the plant requires additional moisture. This measurement means would be an alternative to the soil test probes shown in the circuitry of FIG. 9.

The second part of the circuit operates the thermocouple 110 to produce a cold side used in the condensation of water vapor from the atmosphere. The selector switch 100 is used to select a temperature for the condensation member 14 and 140. This selector switch may be replaced by a dew point measuring device which can be used to adjust the temperature of the condensation member to below that of the ambient dew point in order to effect condensation.

In accordance with the principles of the invention, the method of automatically watering vegetation is described in the following steps. The water requirement of the vegetation is continuously monitored by soil probes or otherwise, to determine whether the vegetation needs additional water. If it is determined that the vegetation does require additional water, the switching circuit is turned on and current flows through the thermocouple. This produces a cold side on the thermocouple which reduces the temperature of the condensation member to below that of the ambient dew point temperature. As this happens water vapor condenses out of the atmosphere onto the condensation member.

The water vapor condensation droplets are then harvested on the condensation member surface at the collector by gravitational means. The condensation member is positioned above the soil containing the vegetation and the collected droplets fall directly onto the soil surrounding the vegetation.

By election, plant food may be carried automatically onto the soil by admixing the falling droplets with a soluble plant food so that the treated droplets will then fall onto the soil carrying some plant food along with the droplet.

The method of watering the vegetation may be manually controlled by a user instead of initiated automatically by selectively overriding the monitoring step and having the user manually turn the apparatus on when watering is desired, and off when watering is not desired.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A device for providing a supply of liquid water from the ambient atmosphere comprising the combination:
   a thermocouple having means forming a thermally hot side and a thermally cold side when energized with electrical current,
   electrical circuitry for operably energizing said thermocouple with electric current, and
   a non-corrodible, hollow condensation member containing a thermally conductive fluid and having an outer condensation surface exposed to the ambient atmosphere and being thermally connected to said cold side of said thermocouple, whereby said electrical current flows through said electrical circuitry to said thermocouple producing a cold side on said thermocouple, said coldness removing heat from said condensation member resulting in said condensation member achieving a temperature below that of the ambient dew point temperature causing water vapor in the air to condense on said condensation surface of said condensation member in sufficient amounts so as to collect into drops and gravitationally drip from said condensation member.

2. A device for automatically watering vegetation comprising the combination:
   a thermocouple having means forming a thermally hot side and a thermally cold side when energized with electrical current,
   electrical circuitry for operably energizing said thermocouple with electric current,
   a hollow condensation member containing a thermally conductive fluid thermally connected to said cold side of said thermocouple, said condensation member having a condensation surface exposed to ambient atmosphere which achieves a temperature below that of the ambient dew point temperature upon operation of said thermocouple causing moisture to condense on said condensation surface,
   and means to harvest the moisture on said surface for application to a point of utilization.

3. The device of claim 2, and circuit means for said thermocouple including a means for detecting the water requirements of said vegetation operably connected to said circuit means and forming a switch whereby when said vegetation does not require water, said switch disrupts electrical current flow to said thermocouple and when said vegetation does require water, said switch causes said current flow to resume to said thermocouple.

4. The device of claim 3, wherein said means for detecting vegetation water requirement consists of a pair of electrical conducting probes which are operably connected to an electrical circuit through one end of each of said probes,
   the other end of each of said probes to be placed in said soil,
   said probes and said circuity forming a switch whereby low electrical resistance of damp soil causes said switch to disrupt said current flow to said thermocouple and high electrical resistance of dry soil causes said current flow to resume to said thermocouple.

5. The device of claim 4, wherein means are provided to manually selectively set the level of moistness of the soil required to disrupt said current flow to said thermocouple.

6. The device of claim 2, wherein a manually selectively adjustable means is provided in said electrical circuitry for controlling said current flow through said thermocouple.

7. The device of claim 2, wherein said condensation member has a condensation surface disposed and formed in a shape such that the condensed water forming thereon will collect gravitationally and drip from a common collector area.

8. The device of claim 7, wherein an attachment is provided to removably attach below said collector area said attachment containing water soluble plant food in a water permeable container whereby drops of water falling into said container will admix with said plant food forming treated drops which will then fall into said soil.

9. The device of claim 7, wherein means are provided to distribute said water drops in more than one place on said soil.

10. The device of claim 2, wherein said condensation member has a condensation surface disposed and shaped such that said condensed water forming thereon will collect and drip from a plurality of areas.

11. A device for automatically watering vegetation comprising the combination:
    a source of electric current,
    at least one thermocouple having means forming a thermally hot side and a thermally cold side when energized with electrical current,
    a fluid reservoir,
    a hollow condensation member operably connected in a continuous circuit to said fluid reservoir,
    said condensation member being thermally conductive,
    a thermally conductive liquid capable of retaining a liquid phase in the range of temperatures from 0° centigrade to 70° centigrade to be carried within said condensation member and retained in said reservoir, and
    a pump operably connected in said circuit to circulate said liquid throughout said condensation member, whereby said electrical current flows from said current source through said electrical circuitry to said thermocouple producing a cold side on said thermocouple, said coldness removing heat from said fluid and said condensation member, resulting in said condensation member achieving a temperature below that of the ambient dew point temperature causing humidity in the air to condense on said condensation member in sufficient amounts so as to collect and gravitationally drip from said condensation member onto soil containing vegetation.

12. A method of watering vegetation which includes the steps of, charging the interior of a hollow condensation member with a thermally conductive fluid, selectively reducing the temperature of said thermally conductive fluid within said condensation member to below that of the ambient dew point temperature to condense water vapor out of the atmosphere onto the surface of the condensation member, aggregating the water vapor condensation into the form of droplets, and applying the droplets to a point of utilization.

13. The method of claim 12, and further characterized by admixing a plant food material with the droplets prior to the final applying step.

14. A method of automatically watering vegetation which includes the steps of, charging the interior of a hollow condensation member with a thermally conductive fluid, continuously monitoring the water requirements of vegetation contained in soil, selectively reducing the temperature of said thermally conductive fluid within said condensation member to below that of the ambient dew point temperature in response to a water requirement for condensing water vapor out of the atmosphere onto said condensation member, collecting the water vapor condensation in the form of droplets, and directing said collected droplets onto said soil surrounding said vegetation.

15. A device for providing a supply of liquid water from the ambient atmosphere comprising the combination:

a thermocouple having means forming a thermally hot side and a thermally cold side when energized with electrical current, electrical circuitry for operably energizing said thermocouple with electric current, and a hollow, sealable condensation member containing a thermally conductive fluid, having an outer condensation surface exposed to the ambient atmosphere and being thermally connected to said cold side of said thermocouple, whereby said electrical current flows through said electrical circuitry to said thermocouple producing a cold side on said thermocouple, said coldness removing heat from said condensation member resulting in said condensation member achieving a temperature below that of the ambient dew point temperature causing water vapor in the air to condense on said condensation surface of said condensation member in sufficient amounts so as to collect into drops and gravitationally drip from said condensation member.

16. A device for providing a supply of liquid water comprising the combination:

a source of electrical current, at least one thermocouple having means forming a thermally hot side and a thermally cold side when energized with electrical current, at least one fluid reservoir, a hollow condensation member communicating with said fluid reservoir, a thermally conductive fluid to be carried within said condensation member and retained in said reservoir, and a means for circulating said fluid throughout said condensation member, whereby said electrical current flows from said current source through said electrical circuitry to said thermocouple producing a cold side on said thermocouple, said coldness removing heat from said fluid and said condensation member, resulting in said condensation member achieving a temperature below that of the ambient dew point temperature causing humidity in the air to condense on said condensation member in sufficient amounts so as to collect and gravitationally drip from said condensation member.

* * * * *